United States Patent [19]
Takada et al.

[11] Patent Number: 5,159,378
[45] Date of Patent: Oct. 27, 1992

[54] LIGHT PROJECTOR FOR RANGE FINDING DEVICE

[75] Inventors: Seiji Takada; Takaaki Kotani, both of Tokyo; Shigenori Goto, Saitama; Tatsuo Saito, Saitama, all of Japan

[73] Assignee: Fuji Photo Film Co., Ltd., Kanagawa, Japan

[21] Appl. No.: 599,311

[22] Filed: Oct. 17, 1990

[30] Foreign Application Priority Data

Oct. 20, 1989 [JP] Japan ............. 1-123316[U]
Oct. 20, 1989 [JP] Japan ............. 1-123317[U]

[51] Int. Cl.⁵ .................. G03B 13/36; G01C 3/08
[52] U.S. Cl. ........................... 354/403; 356/1
[58] Field of Search ............. 354/402–409; 356/1

[56] References Cited

U.S. PATENT DOCUMENTS

| | | | |
|---|---|---|---|
| 3,813,679 | 5/1974 | Hasegawa et al. | 354/403 |
| 3,936,187 | 2/1976 | Momose | 354/403 |
| 3,961,178 | 6/1976 | Hosoe et al. | 354/407 |
| 4,320,947 | 3/1982 | Komine | 354/408 |
| 4,367,934 | 1/1983 | Matsui | 354/403 |
| 4,391,513 | 7/1983 | Fujiki | 356/1 |
| 4,400,071 | 8/1983 | Tamura et al. | 354/409 |
| 4,444,477 | 4/1984 | Tamura | 354/403 |
| 4,470,681 | 9/1984 | Johnson | 354/403 |
| 4,487,495 | 12/1984 | Kimata et al. | 354/403 |
| 4,511,248 | 4/1985 | Abbas | 356/1 X |
| 4,566,773 | 1/1986 | Kaneda | 354/403 |
| 4,571,048 | 2/1986 | Sugawara | 354/403 |
| 4,582,411 | 4/1986 | Ohmura et al. | 354/403 |
| 4,586,806 | 5/1986 | Isoguchi et al. | 354/403 |
| 4,682,886 | 7/1987 | Toyama et al. | 356/1 |
| 4,720,724 | 1/1988 | Yokoo | 354/403 |
| 4,963,911 | 10/1990 | Matsui et al. | 354/403 |

FOREIGN PATENT DOCUMENTS 59-109165 7/1984 Japan .

Primary Examiner—W. B. Perkey
Attorney, Agent, or Firm—Young & Thompson

[57] ABSTRACT

A range finding device having a light projector and a light receiver. The light projector has a mirror for reflecting toward a subject near-infrared light emitted laterally from an IRED. The mirror has a reflection surface extending farther in a direction perpendicular to the base line direction than in the base line direction. According to the embodiment of this invention, for a light source unit, a base plate holding a plurality of IREDs is packaged in a transparent plastic package. The base plate is formed with arms extending out of the package. The light source unit is fixed on the camera body by the arms. The light receiver also uses a base plate with the similar arms.

9 Claims, 6 Drawing Sheets

LIGHT PROJECTOR FOR RANGE FINDING DEVICE

FIELD OF THE INVENTION

The present invention relates to a range finding device of the active triangulation type, and more particularly to a light projector capable of measuring distance with high precision.

BACKGROUND OF THE INVENTION

Photographic cameras and video cameras are equipped with autofocus systems by which a taking lens can be automatically adjusted to the proper focus for a subject. An autofocus system is constructed of a range finding device for detecting the distance to a subject and a lens setting mechanism for positioning the taking lens in accordance with the detected subject distance. Various types of range finding devices are known. Among these, an active triangulation type is most widely used. Such an active triangulation type range finding device is comprised by a light projector for projecting a spot of light toward a subject, a light receiver for receiving light reflected from the subject, and an arithmetic operation unit for calculating the subject distance in accordance with a signal from the light receiver and determining the setting position of the taking lens in accordance with the calculated subject distance. As a light source of the light projector, an IRED (near-infrared light emission diode) for emitting near-infrared light is mainly used. As a light receiving element of the light receiver, a PSD (position sensitive detector) is mainly used which generates two channel signals corresponding to the incident position and intensity of the reflected light.

In order to emit near-infrared light of sufficient intensity for a relatively far subject, a mirror with a parabolic reflective surface is disposed behind an IRED, and near-infrared light emitted obliquely from the IRED and reflected by the mirror is projected toward the subject. For example, a light projector disclosed in Japanese Utility Model Laid-Open Publ. No. 59-109165 has a mirror 71 surrounding an IRED 70 as shown in FIGS. 10 and 11. Near-infrared light 72 radiated obliquely from the IRED 70 is reflected forward by the parabolic reflection surface 71a of the mirror 71. With this light projector, not only near-infrared light 73 directly incident on a light projecting lens 74 but also near-infrared light 72 incident on the light projecting lens 74 after having been reflected by the mirror 71, are used in range finding. Therefore, the intensity of measuring light 75 is sufficient to measure greater subject distances.

However, as shown in FIG. 12, the pattern of near-infrared light projected toward a principal subject S is composed of a central area 75a and a peripheral annular area 75b surrounding the central area 75a. One side of the central area 75a has a length of 40 to 50 cm at a subject distance of about 8 meters for example. It often occurs therefore that the peripheral area 75b extends partially beyond the subject S.

On the other hand, a light pattern 90 is formed on the light receiving surface of a PSD 79 as shown in FIG. 13. Since the direction of range finding resolution of the PSD 79 is in the base line direction X, the ratio between two channel signals outputted from the PSD 79 has a value equivalent to the value when a near-infrared spot of light is incident upon the center $G_1$ of gravity of the central area 90a and the peripheral area 90b of the light pattern 90. The equivalent light incident position is therefore displaced by a length D from the correct incident position, and this is an important cause of range finding errors.

With a range finding device which projects a single spot of light onto the center of a photographic scene, the spot of light can pass between two persons when they are standing at a distance from each other, so that the taking lens is focussed on infinity. With a recent range finding device disclosed for example in U.S. Pat. Nos. 4,470,681 and 4,571,048, three spot beams of light are sequentially projected in the lateral direction of a photographic scene; the subject distance is measured for each spot beam of light, and the most suitable one of the three measured distances is selected. As a light projector for such a multi-beam range finding device, there is used a light source unit having a plurality of light sources. An example of such a light source unit 95 is shown in FIG. 14 and has a plurality of IREDs 92, 93 and 94 mounted on a base plate 96 for the emission of near-infrared light, these IREDs are sealed within a transparent molded plastic package 97. The light source unit 95 is fitted within a recess 91 formed in the camera body to hold the light source unit 95 in position. Similarly, a PSD 79 used as a light receiver with this light source unit 95 is sealed within a transparent package to hold the light receiver in position using the outer contours of the package.

This mounting method however has a limit of positioning precision of the IREDs 92 to 94 in the order of 200 microns at most because of the molding precision of the light source unit 95 and the working precision of the recess 97. For this reason, as shown in FIG. 15, it often happens that the alignment line P of the IREDs 92 to 94 cannot be set correctly relative to the base line direction X such that the angle $\theta$ is 90°. If near-infrared light beams are reflected by a subject having parts at the same object distances, such as a wall, then near infrared light beams 92a, 93a and 94a incident on a PSD 79 are disposed on a line 98 which is inclined at the same angle as the alignment line P of the IREDs 92 to 94. In such a case, the distance data calculated for each near-infrared light beam 92a, 93a, 94a become different, which is a substantial cause of range finding error. Furthermore, if the PSD 79 is correctly aligned so as to match the direction of range finding resolution in the base line direction X, a range finding error will be generated for the same reason described above.

OBJECTS OF THE INVENTION

It is therefore an object of the present invention to provide a light projector capable of increasing the amount of measuring light without introducing any range finding error.

It is another object of the present invention to provide a light projector capable of being mounted on a camera body with high precision.

SUMMARY OF THE INVENTION

In order to achieve the above and other objects and advantages of this invention, the light projector has a mirror whose light reflective surface extends in the lateral direction perpendicular to the base line. According to a preferred embodiment of this invention, a base plate for holding a plurality of light emission elements or light receiving elements is sealed within a transparent package. Arms are formed extending from the base plate outside of the transparent package. By means of the arms, a light source unit or a light receiving unit is fixed to a camera body.

According to this invention, of the light beams laterally radiated from a light emitting element, only a light beam perpendicular to the base line is reflected from the mirror. Therefore, the pattern of incident light will not be broadened in the base line direction on the light receiving element, thereby ensuring range finding with high precision and a larger amount of measuring light.

Furthermore, the light projector is fixed to a camera body by means of arms so that the mounting precision of the light projector is not influenced by the dimensional precision of the transparent package and a recess formed in the camera body, as has been the case with conventional light projectors. Accordingly, it becomes possible to align light emitting elements along a line perpendicular to the base line, thereby allowing range finding with high precision.

BRIEF DESCRIPTION OF THE DRAWINGS

The above and other objects and advantages of the present invention will become apparent for those skilled in this art from the following detailed description of the invention when read in connection with the accompanying drawings, in which.

DETAILED DESCRIPTION OF THE PREFERRED EMBODIMENTS

Figure 1:
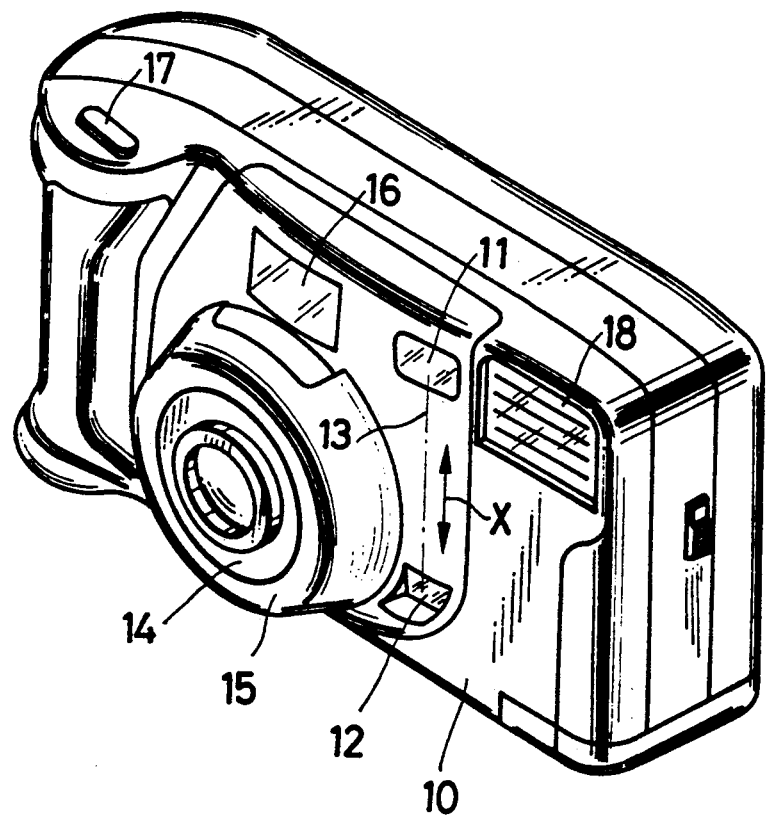
FIG. 1 is a perspective view showing a camera incorporating a light projector of this invention.

Referring to FIG. 1 showing an autofocus camera, on the front surface of a camera body 10 there are formed a light projecting window 11 and a light receiving window 12 along a base line 13. Transparent plates passing only near-infrared light are attached to the windows 11 and 12. A light projector 20 (refer to FIG. 2) is mounted at the back of the light projecting window 11, and a light receiver is mounted at the back of the light receiving window 12. The light projector and light receiver constitute a range finding device of an autofocus system which measures subject distance by means of optical triangulation.

Substantially at the center of the camera body 10, a fixed lens barrel 15 is integrally mounted on the camera body, the fixed lens barrel 15 slidably holding a movable lens barrel 14. This movable lens barrel 14 is set at the lens position corresponding to the subject distance measured with the range finding device. In this embodiment, the base line 13 extends vertically of the camera body 10. The base line may be defined instead in the horizontal direction of the camera body, whereupon the light projecting and receiving windows 11 and 12 will be disposed in the horizontal direction of the camera body 10. Reference numeral 16 represents a finder window, 17 a shutter button, and 18 an electronic flash unit. Reference character X represents the direction of the base line 13.

Figure 2:
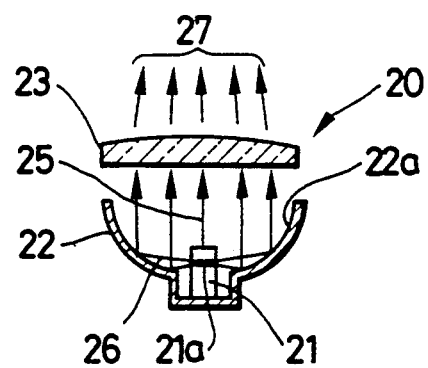
FIG. 2 is a sectional view of a light projector of this invention.
Figure 3:
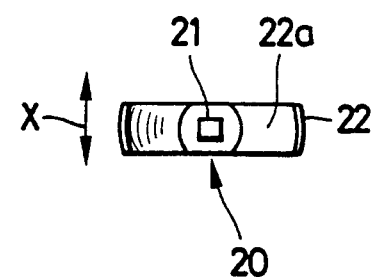
FIG. 3 is a front view of the light projector shown in FIG. 2 with the light projecting lens omitted.
Figure 4:
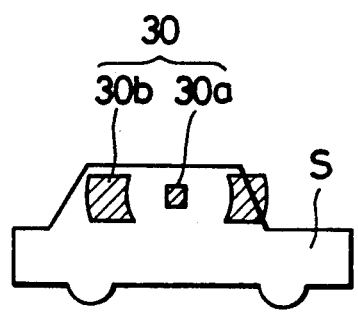
FIG. 4 is a schematic diagram illustrating a photographic scene illuminated with the light projector shown in FIG. 2.

Referring now to FIGS. 2 and 3, the light projector 20 is comprised by a light source 21, a mirror 22 having a parabolic mirror surface 22a which reflects forwardly light emitted laterally from the light source 21, and a light projecting lens 23. As a light source, there is used an IRED which emits near-infrared light. The mirror 22 has the configuration of an ordinary surface of revolution, such as a parabolic mirror having a circular shape, but which, as viewed from the front side, has been truncated to remove its upper and lower segments. Thus, the mirror 22 extends laterally in a direction perpendicular to the base line direction X.

The IRED 21 emits near-infrared light from its p-n junction 21a when the shutter button 17 is half depressed. Some of this near-infrared light 25, directly radiated forward, passes through the light projecting lens 23 and is projected toward the subject to be photographed. Other near-infrared light 26, radiated laterally from the p-n junction 21a of the IRED 21, is reflected by the parabolic reflective surface 22a and then passes through the light projecting lens 23. The near-infrared light beams 25 and 26 are used as measuring light 27.

At the start of range finding, when the shutter button 17 is halfway depressed, measuring light 27 is projected from the light projector 20 toward the subject. The parabolic reflection surface 22a is narrow in the base line direction X and wide in a direction perpendicular to the direction X, so that the measuring light 27 projected toward the subject S has a pattern 30 having a central area 30a and two peripheral areas 30b.

Figure 5:
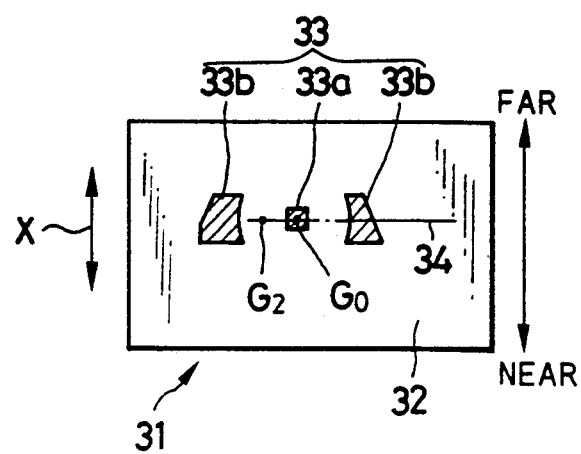
FIG. 5 is a schematic diagram illustrating the light receiving surface of a PSD under the illumination condition shown in FIG. 4.

The light receiver 31 is comprised, as is well known in the art, by a lens (not shown) and a light receiving element, to receive the measuring light reflected from the subject S. In this embodiment, a PSD 32 is used as the light receiving element. A light pattern 33 as shown in FIG. 5 is formed on the light receiving surface of the PSD 32. The light pattern 33 is comprised by a central area 33a and two peripheral areas 33b, and the center G₂ of gravity of the light pattern 33 scarcely shifts in the base line direction X. Therefore, the center $G_2$ of gravity of the light pattern 33 and the center $G_0$ of gravity of the central area 33a are substantially aligned on the same horizontal line 34. Consequently, without any influence from the peripheral areas 33b, two proper channel current values are derived from two output terminals of the PSD 32. In addition, light is incident on the PSD 32 both at the central area 33a and at peripheral areas 33b, so that currents having a larger absolute value can be obtained as compared with light incident upon only the central area 33a, resulting in an improvement of the S/N ratio and a longer measurable subject distance. Even if the two peripheral areas 33b have different shapes, the center $G_2$ of gravity of the light pattern 33 shifts only along the horizontal line 34 so that no measuring error is generated.

The ratio between two channel currents from the PSD 32 is calculated by an arithmetic operation device (not shown). This ratio is dependent only on the light incident position irrespective of the intensity of the near-infrared light. In accordance with this ratio signal, which transmits subject distance information, a lens setting mechanism (not shown) is driven to set the movable lens barrel 14 to a predetermined lens setting position. In this embodiment, a single IRED is used. In the case of a multi-beam type, for example, three IREDs are used. In such a case, a mirror is provided for each IRED.

Figure 6:
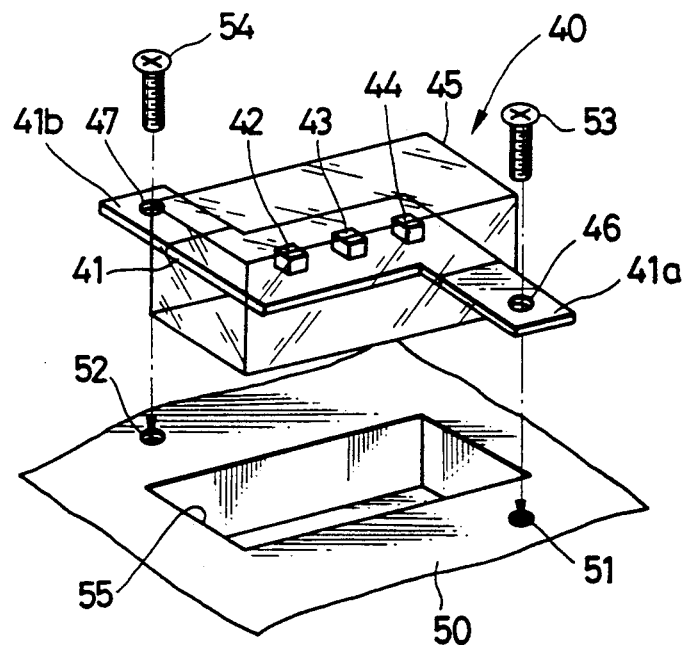
FIG. 6 is an exploded perspective view showing the relationship between a light source unit and a camera body.
Figure 7:
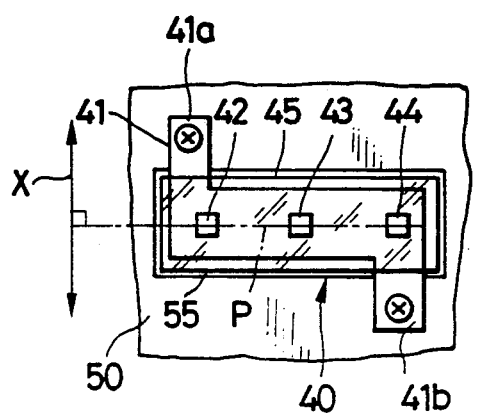
FIG. 7 is a plan view showing the light source unit of FIG. 6 mounted on a camera body.

FIGS. 6 and 7 show a multi-beam type light projector comprised by a light source unit 40 and a light projecting lens (not shown). This light source unit 40 has three IREDs 42, 43 and 44 disposed on a base plate 41 and is sealed within a transparent package 45. The base plate 41 is integrally formed with arms 41a and 41b which extend out of the transparent package 45. The arms 41a and 41b are formed with holes 46 and 47 through which screws 53 and 54 are inserted and threaded with threaded holes 51 and 52 formed in an inner wall 50 of the camera body 10. Thus, the light source unit 40 is held in a recess 55 and fixedly connected to the wall 50 of the camera body 10. Alternatively, two plastic pins may be formed integrally with the wall 50 and thermally riveted after being inserted through the holes 46 and 47. The front surface of the transparent package 45 may have a curved shape for use as the light projecting lens.

The mounting precision of the light source unit 40 is not influenced by the molding precision of the transparent package 45 and other factors, and the alignment line P can be positioned perpendicular to the base line direction X as shown in FIG. 7. As a result, the mounting precision can be within the range of ±50 microns.

Figure 8:
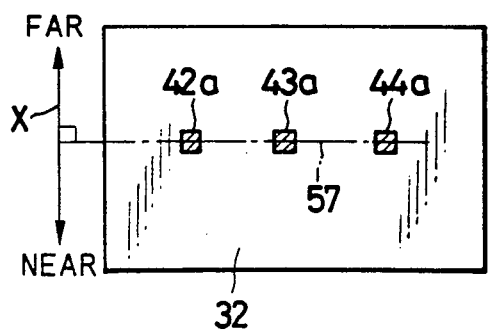
FIG. 8 is a schematic diagram illustrating the light receiving surface of a PSD when a subject is illuminated with the light projector shown in FIG. 6.

The operation of the multi-beam type light projector will next be described briefly. At the start of range finding, the IREDs 42, 43 and 44 are sequentially driven to emit three near-infrared spot beams of light along a line extending laterally of a photographic scene. If three light portions of one wall of a building, the reflected light beams 42a, 43a and 44a will be incident upon the light receiving surface of the PSD 32 as shown in FIG. 8. Two channel signals for each reflected light beam are outputted from the PSD 32 and three bodies of distance data are obtained from the ratios between respective reflected light beams. Since the reflected light beams 42a, 43a and 44a are aligned on the same line 57 perpendicular to the base line direction X, the three distance data ar all the same, thereby to ensure correct range finding. On the other hand, if three light beams are applied to three subjects at different subject distances, the resultant three distance data will be different. In such a case, the most suitable one among three different distance data is selected in accordance with a predetermined priority order such as a near distance priority.

The number of light emitting elements such as IREDs may be one, two, or four or more. The light projector and light receiver may be disposed in the horizontal direction of the camera body 10 to make parallel the base line 13 and the IRED alignment line P. Furthermore, the mirror 22 shown in FIGS. 2 and 3 may be mounted on each IRED 42 to 44. In this case, each mirror is formed at its central area with a hole receiving an IRED, fixedly to mount the mirror on the base plate 41.

Figure 9:
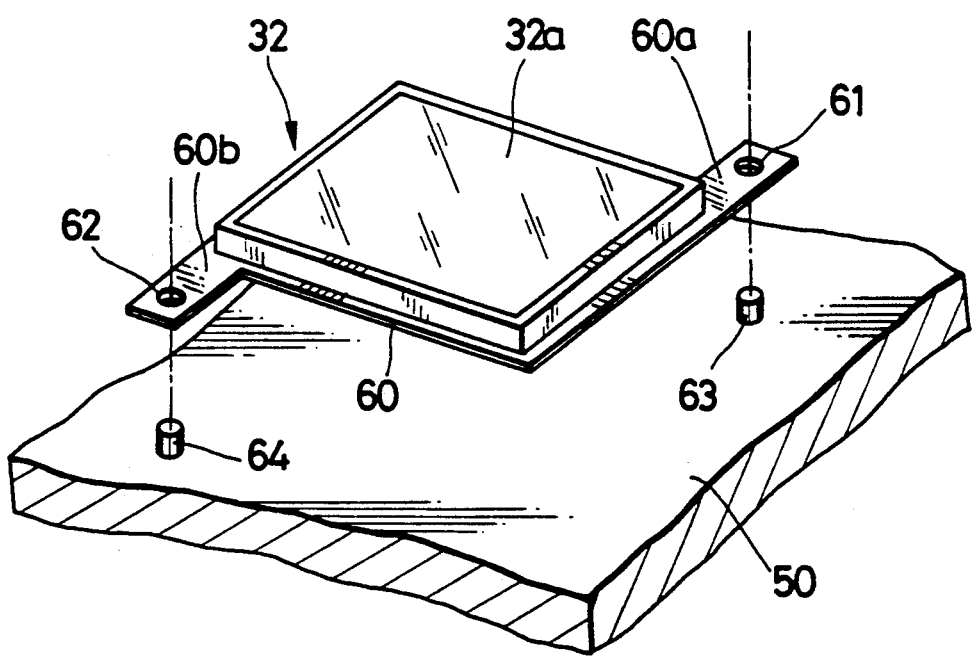
FIG. 9 is an exploded perspective view illustrating the mounting of a PSD on a camera body.
Figure 10:
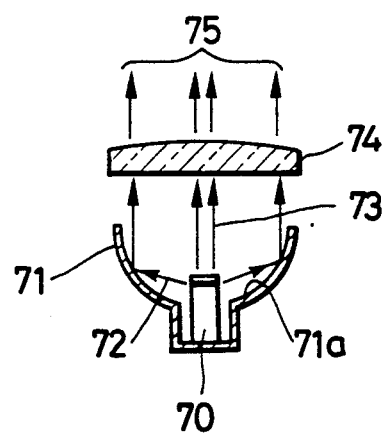
FIG. 10 is a sectional view of a conventional light projector.
Figure 11:
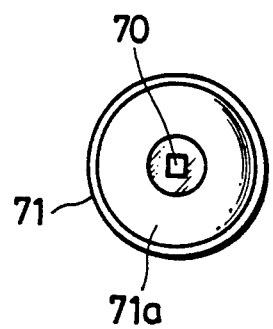
FIG. 11 is a front view of the light projector shown in FIG. 10 with the light projecting lens omitted.
Figure 12:
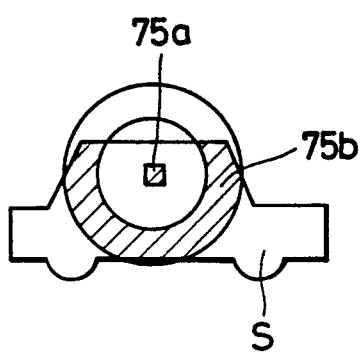
FIG. 12 is a schematic diagram illustrating a photographic scene illuminated with the light projector shown in FIG. 10.
Figure 13:
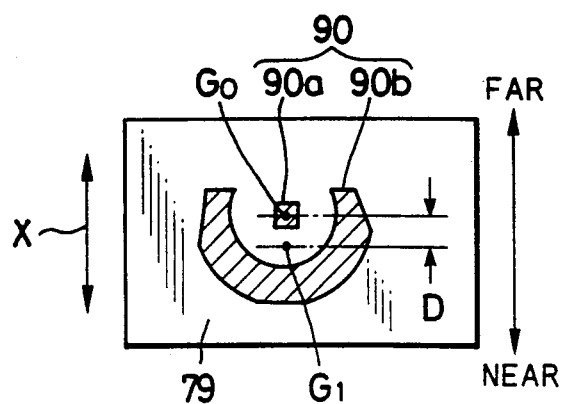
FIG. 13 is a schematic diagram illustrating the light receiving surface of a PSD under the illumination condition shown in FIG. 12.
Figure 14:
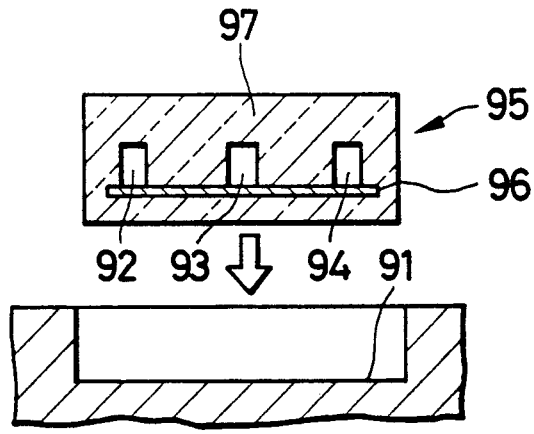
FIG. 14 is a sectional view of a conventional light source unit.
Figure 15:
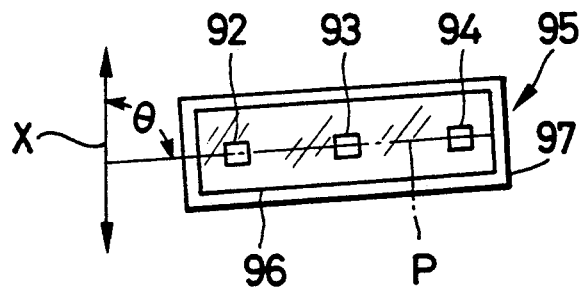
FIG. 15 is a plan view showing the obliquely mounted light source unit shown in FIG. 14.
Figure 16:
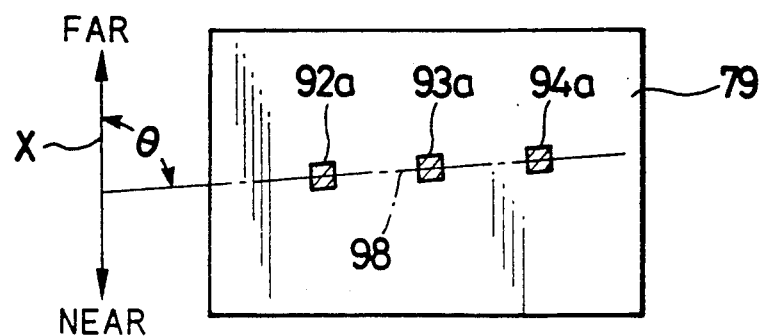
FIG. 16 is a schematic diagram showing the light receiving surface of the light receiver wherein the light source unit shown in FIG. 15 is used.

As shown in FIG. 9, the light receiver may be mounted on the camera body by means of arms of a base plate. In FIG. 9 the lens is omitted. A PSD 32 having a light receiving surface 32a is mounted on a base plate 60 which is integrally formed with two arms 60a and 60b. The arms 60a and 60b are formed with holes 61 and 62 which receive pins 63 and 64 embedded in a camera wall 50. Accordingly, the direction of range finding resolution of the PSD 32 can be correctly aligned with the base line direction X. The pins 63 and 64 are made of plastic thermally riveted once arms 60a and 60b are positioned thereon.

In the above embodiments, an IRED is used as a light source. Instead, flash tubes or ordinary lamps may be used. Furthermore, instead of near-infrared light, a visible light beam may be used. In such a case, a plurality of pulse lights having a desired frequency are preferably used to discriminate between the measuring light and ambient light so as to avoid a range finding error. Furthermore, as the light receiving element, a CCD image sensor or the like may be used in place of a PSD.

Although the present invention has been described in detail above with reference to preferred embodiments, various changes and modifications within the scope and spirit of the invention will be apparent to those having skill in this technological field. Thus, the invention should be considered as being limited only by the scope of the appended claims.

What is claimed is:

1. A light projector for use with an active triangulation type range finding device which projects light emitted from the light projector toward a subject to be photographed and measures the distance to the subject based on the incident position on a light receiver of light reflected from the subject, the projector and receiver being spaced apart along a base line, said light projector comprising:
   a light source for emitting said light; and
   a mirror for reflecting light emitted laterally from said light source toward said subject, said mirror having a reflection surface shaped as a surface of revolution having opposed side portions truncated therefrom, such that said reflection surface extends farther in a direction perpendicular to the base line than in a direction parallel to the base line.

2. A light projector according to claim 1, wherein said light source is a near-infrared light emission diode which emits near-infrared light.

3. A light projector according to claim 1, wherein said mirror is parabolic and has a circular shape.

4. A light projector for use with an active triangulation type range finding device which projects light emitted from the light projector toward a subject based on the incident position on a light receiver of light reflected from the subject, said light projector comprising:

a light source for emitting said light, said light source having a plurality of light emitting elements disposed along a line extending perpendicular to or in parallel with a base line interconnecting said light projector and said light receiver so as to illuminate different portions of a scene to be photographed, each of said light emitting elements including a mirror for reflecting light emitted laterally therefrom, said mirror being a surface of revolution which has upper and lower segments removed therefrom such that said mirror has a reflection surface extending farther in a direction perpendicular to the base line than in a direction parallel to the base line;

a base plate for mounting said light source;

a transparent package for packaging said light source;

an arm integrally formed with said base plate, said arm extending from said transparent package; and means for fixing said arm to a camera body.

5. A light projector according to claim 4, wherein each of said light emitting element is a near-infrared light emitting diode for emitting near-infrared light.

6. A light projector according to claim 4, wherein said transparent package is fitted in a recess of said camera body.

7. A light projector according to claim 4, including two arms projecting from opposite ends of said base plate for fixing the light projector to a camera body.

8. A light projector according to claim 7, wherein said fixing means includes two threaded holes formed in said camera body, two holes formed respectively in said two arms, and two screws threading with said threaded holes via said holes in said arms.

9. A light projector according to claim 4, wherein said mirror is parabolic and has a circular shape.

* * * * *